United States Patent [19]
Hogan et al.

[11] 3,816,925
[45] June 18, 1974

[54] TAPE MEASURES

[75] Inventors: Brian D. Hogan, Birmingham; Colin John Twamley, Warley, both of England

[73] Assignee: Rabone Chesterman Limited, Birmingham, England

[22] Filed: Mar. 26, 1973

[21] Appl. No.: 344,522

[52] U.S. Cl. ............................. 33/138, 242/84.8
[51] Int. Cl. .................................. G01b 3/10
[58] Field of Search....... 33/138, 173, 143 J, 143 K; 242/84.8, 107

[56] References Cited
UNITED STATES PATENTS

| | | | |
|---|---|---|---|
| 2,132,202 | 10/1938 | Carlson | 33/138 |
| 2,536,766 | 1/1951 | Pechstein | 242/84.8 |
| 3,435,529 | 4/1969 | Quenot | 33/138 |
| 3,577,641 | 5/1971 | Smith | 33/138 |

FOREIGN PATENTS OR APPLICATIONS

| | | | |
|---|---|---|---|
| 499,819 | 1/1939 | Great Britain | 33/138 |
| 1,305,855 | 8/1962 | France | 33/138 |
| 859,955 | 10/1952 | Germany | 33/138 |
| 144,499 | 3/1954 | Sweden | 242/84.8 |

*Primary Examiner*—Louis R. Prince
*Assistant Examiner*—Willis Little
*Attorney, Agent, or Firm*—Norris & Bateman

[57] ABSTRACT

Spring loaded coiled steel or like flexible measuring tape is provided with a pushbutton braking device which includes an elongate brake member movable along one wall of the tape housing to bear on the tape so as to retain it in an extended condition, and an actuating member incorporating a pushbutton slideable along the upper wall of the housing and linked to the brake member by interengaging peg and slot or like camming formations for positive movement of the brake member in a rectilinear path. The device has few moving parts and is simple to assemble and operate. The housing and both said members may be formed from plastics materials.

7 Claims, 1 Drawing Figure

PATENTED JUN 18 1974  3,816,925
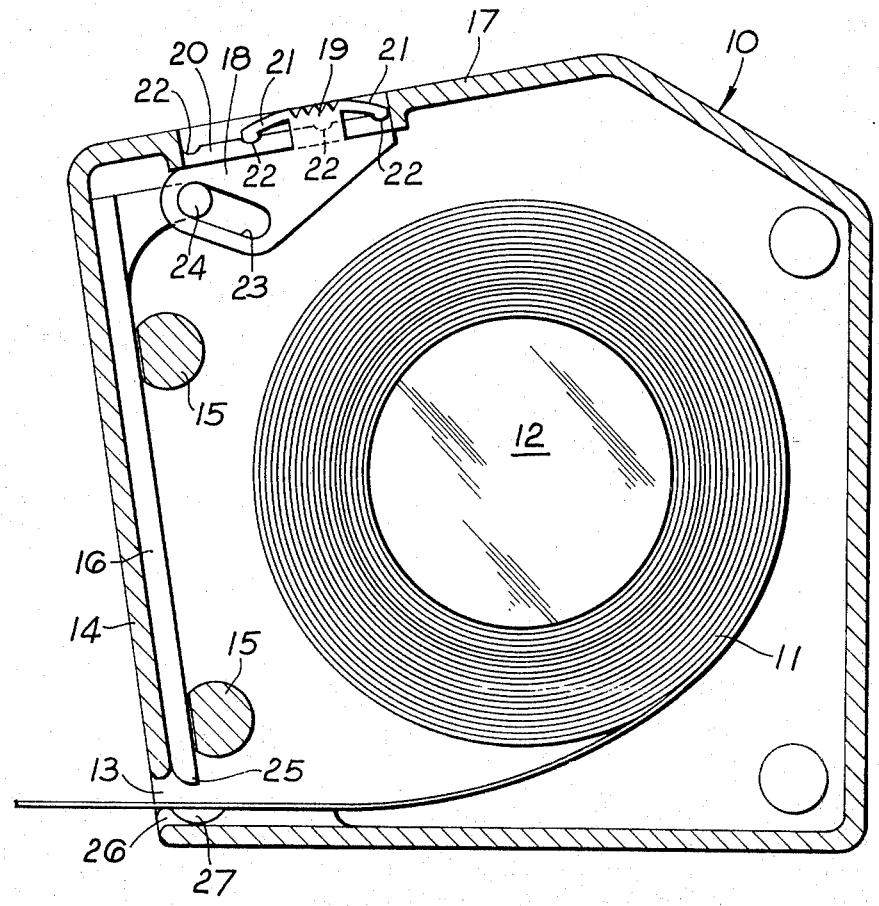

TAPE MEASURES

This invention relates to tape measures of the kind comprising a housing which a flexible measuring tape, typically a steel ribbon, is coiled for progressive extension or retraction through a mouth defined by the housing; a return spring within the housing acting to wind the tape back into its coil upon retraction. The biasing force exerted by the spring may be merely sufficient to effect rewinding as the tape is retracted manually, or it may be stronger causing automatic "fly-back" retraction of the tape upon release from an extended position. Such measures are hereinafter referred to as "tape measures of the kind described."

The object of the invention is to provide braking device in a tape measure which is readily operable by a user for selective retention of the tape at any extended position and release thereof for retraction into the housing.

According to the invention a tape measure of the kind described has a braking device including a brake member movable between a "brake on" position at which it bears on a part of the tape lying within the mouth to resist longitudinal movement thereof and a "brake off" position at which the tape is free for said movement characterised in that said brake member is movable in first rectilinear path defined by a housing of the measure, and in that the braking device includes an actuating member movable in a second rectilinear path at an angle to the first path, and interengaging drive formations of the members whereby said rectilinear movement of the actuating member is transmitted to the brake member.

A preferred embodiment of the invention is now more particularly described with reference to the accompanying drawing showing a vertical sectional view of an assembled tape measure of the kind described.

The tape measure includes an irregular five-sided closed housing 10 formed from a pair of hollow mouldings of plastics material secured together by screws, rivets or the like; although it is contemplated that rectangular or other shapes or constructions of housing may be employed.

A graduated steel tape 11 is coiled on a drum 12 within housing 10 which drum accommodates the return (not shown) in a manner well-known in the art. The tape can be extended by drawing it manually through a mouth 13 defined at one corner of housing 10.

The inner surface of a planar side wall 14 of the housing extending upwardly from mouth 13 defines, in conjunction with a pair of internal pillars 15 spaced from said surface, a rectilinear path within the housing in which an elongate brake member 16 is in sliding engagement. The upper end of wall 14 merges with another planar side wall 17 at right-angles thereto. An inner surface of wall 17 forms a second rectilinear path with which an actuating member 18 is in sliding engagement. The latter member includes pushbutton 19 which projects through a longitudinal slot 20 in wall 17 and has a pair of flexible ears 21 which resiliently engage a recessed outer face portion of wall 17, notches 22 in said outer face serving to retain the actuating member at one or other of its extreme positions of travel.

A part of actuating member 18 which projects inwardly of the housing defines a diagonal slot 23 lying at an angle to the path of movement of actuating member 18.

Brake member 16 has projection at its upper end which carries a laterally projecting peg 24 engaged in slot 23, thus sliding movement of actuating member 18 from one extreme position to the other will cause corresponding rectilinear sliding movement of brake member 16 by reason of their interengaging drive formations in the form of slot 23 and peg 24, to cause the lower end of 25 of member 16 to be urged between a "brake-on" position at which said end 25 bears on the part of tape 11 lying within mouth 13 to resist longitudinal movement of the tape through the mouth by urging it against an abutment formation 26 on the opposite side of the mouth; and a "brake-off" position ( as shown in the drawing) at which end 25 is lifted clear of mouth 13 to permit unobstructed movement of the tape.

In the preferred form, end 25 of brake member 16 is given a rounded profile and the abutment formation 26 includes a hollow 27 into which a part of tape 11 is slightly flexed when the brake is applied to give added security. Alternatively a pad of resilient material may be incorporated in abutment 26 and/or the end 25 of brake member 16.

Both brake member 16 and actuating member 18 can be formed as mouldings of plastics material, and as the brake incorporates only these two moving parts manufacture and assembly of the tape measure is greatly facilitated.

The positioning of push button 19 on the upper side of housing 10 makes the tape measure particularly convenient to handle and use, especially with the larger sizes of housing necessary for long tapes, and the rectilinear action of braking member 16 in a direction substantially normal to the path of the tape gives direct and effective braking enabling an adequate holding force to be exerted on the tape without causing "creep" i.e., longitudinally displacement of the tape as the brake is applied. This latter feature enables accuracy to be maintained in situations where the graduations of the tape are read by reference to the relative position of mouth 13, of where the tape is used to take inside measurements by adding the width of housing 10 to the reading so obtained.

What we claim is:

1. A tape measure comprising; a housing; a flexible measuring tape coiled within the housing about a lateral axis for progressive extension or retraction through aperture means defining a mouth of the housing; a brake member movable within the housing in a first rectilinear path between a "brake-on" position at which it bears on a part of the tape at said mouth to resist longitudinal movement thereof, and a "brake-off" position at which the tape is free for said movement; an actuating member movable within the housing in a second rectilinear path at an angle to the first path, the directions of displacement of said actuating member in said second path being normal to the direction of said lateral axis; and interengaging motion transmitting formations on said members whereby rectilinear movement of said actuating member is positively transmitted to the brake member for movement of the latter.

2. A tape measure according to claim 1 characterised in that said interengaging motion transmitting formations comprise a slot defined in a portion of one of the members extending at an angle to its path of movement; and a peg carried by the other member and engaged in the slot.

3. A tape measure according to claim 1 characterised in that the path of movement of the brake member lies along a first planar side wall of the housing which wall extends from a lower corner of the housing defining the mouth, and the path of movement of the actuating member lies along a second planar side wall of the housing normal to the first wall.

4. A tape measure according to claim 3 characterised in that said path of movement of the brake member is substantially normal to the path of the tape through the mouth.

5. A tape measure according to claim 3 characterised in that the actuating member includes a pushbutton on the upper side of the housing.

6. A tape measure according to claim 5 characterised in that said pushbutton includes a flexible formation for resilient engagement with part of the housing to retain the actuating member at the "brake-on" or "brake-off" positions.

7. A tape measure defined in claim 1, wherein said members are slidably mounted on intersecting housing walls and have adjacent ends within the housing provided with said motion transmitting formations.

* * * * *

UNITED STATES PATENT OFFICE
CERTIFICATE OF CORRECTION

PATENT NO. : 3,816,925

DATED : June 18, 1974

INVENTOR(S) : Brian D. Hogan et al

It is certified that error appears in the above–identified patent and that said Letters Patent are hereby corrected as shown below:

On the first page the foreign application priority data was omitted. Please insert the following after the application number:

Foreign Application Priority Data

April 11, 1972 Great Britain ..........16534

Signed and sealed this 17th day of June 1975.

(SEAL)
Attest:

RUTH C. MASON
Attesting Officer

C. MARSHALL DANN
Commissioner of Patents
and Trademarks